US007992209B1

(12) United States Patent
Menoher et al.

(10) Patent No.: US 7,992,209 B1
(45) Date of Patent: Aug. 2, 2011

(54) BILATERAL COMMUNICATION USING MULTIPLE ONE-WAY DATA LINKS

(75) Inventors: Jeffrey Charles Menoher, Norwalk, CT (US); James Hope, Greenwich, CT (US); Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 957 days.

(21) Appl. No.: 11/879,968

(22) Filed: Jul. 19, 2007

(51) Int. Cl.
*G06F 21/00* (2006.01)
(52) U.S. Cl. .............................. 726/26; 726/16; 726/27
(58) Field of Classification Search ........... 713/151–152
See application file for complete search history.

(56) References Cited

U.S. PATENT DOCUMENTS

| | | | | |
|---|---|---|---|---|
| 4,672,601 | A | 6/1987 | Ablay | 370/277 |
| 5,282,200 | A | 1/1994 | Dempsey et al. | 370/245 |
| 5,450,493 | A | 9/1995 | Maher | |
| 5,703,562 | A | 12/1997 | Nilsen | |
| 5,769,527 | A | 6/1998 | Taylor et al. | 362/85 |
| 5,983,332 | A | 11/1999 | Watkins | 711/202 |
| 6,101,321 | A | 8/2000 | Cok et al. | |
| 6,262,993 | B1 | 7/2001 | Kirmse | 370/463 |
| 6,317,831 | B1 * | 11/2001 | King | 713/171 |
| 6,370,621 | B1 | 4/2002 | Keller | |
| 6,393,529 | B1 | 5/2002 | Keller | |
| 6,490,661 | B1 | 12/2002 | Keller et al. | |
| 6,546,422 | B1 | 4/2003 | Isoyama et al. | 709/225 |
| 6,631,401 | B1 | 10/2003 | Keller et al. | |
| 6,665,268 | B1 | 12/2003 | Sato et al. | 370/242 |
| 6,711,263 | B1 | 3/2004 | Nordenstam et al. | |
| 6,728,213 | B1 | 4/2004 | Tzeng et al. | 370/235 |
| 6,792,432 | B1 | 9/2004 | Kodavalla et al. | 707/103 R |
| 6,807,166 | B1 | 10/2004 | Ohura | 370/352 |
| 6,976,087 | B1 | 12/2005 | Westfall et al. | |
| 6,988,148 | B1 | 1/2006 | Sheth | 709/245 |
| 7,016,085 | B2 | 3/2006 | Gonzalez et al. | 358/405 |
| 7,095,739 | B2 | 8/2006 | Mamillapalli et al. | 370/390 |

(Continued)

FOREIGN PATENT DOCUMENTS
WO WO 2004/105297 A2 12/2005

OTHER PUBLICATIONS

"Veto Uni-directional Network Bridge and Data Pump Applications White Paper", UNB and DPA White Paper by Tenix Datagate Pty Ltd, 2002, pp. 1-6.

(Continued)

*Primary Examiner* — Minh Dinh
*Assistant Examiner* — Venkat Perungavoor
(74) *Attorney, Agent, or Firm* — Amster, Rothstein & Ebenstein LLP

(57) ABSTRACT

A bilateral data transfer system comprising a first node, a second node, a first one-way link for unidirectional transfer of first data from the first node to the second node, and a second one-way link for unidirectional transfer of second data from the second node to the first node, wherein the unidirectional transfer of the first data across the first one-way link and the unidirectional transfer of the second data across the second one-way link are independently administered by the bilateral data transfer system. Under such bilateral data transfer system, each of the one-way data links may be subject to separately administered security restrictions and data filtering processes. Hence, it enables secure bilateral communications across different network security domains.

23 Claims, 2 Drawing Sheets

U.S. PATENT DOCUMENTS

| | | |
|---|---|---|
| 7,246,156 B2 | 7/2007 | Ginter et al. |
| 7,260,833 B1 | 8/2007 | Schaeffer |
| 7,339,929 B2 | 3/2008 | Zelig et al. .................... 370/390 |
| 7,356,581 B2 | 4/2008 | Hashimoto .................. 709/224 |
| 7,370,025 B1 | 5/2008 | Pandit ............................... 707/1 |
| 7,389,323 B2 | 6/2008 | Tanimoto ..................... 709/206 |
| 7,440,424 B2 | 10/2008 | Nam et al. ................... 370/310 |
| 7,454,366 B2 | 11/2008 | Kato ............................... 705/21 |
| 7,512,116 B2 | 3/2009 | Ohura .......................... 370/352 |
| 7,529,943 B1 | 5/2009 | Beser ........................... 713/181 |
| 2002/0003640 A1 | 1/2002 | Trezza |
| 2002/0118671 A1 | 8/2002 | Staples et al. ................ 370/352 |
| 2003/0058810 A1 | 3/2003 | Petronic |
| 2003/0112809 A1 | 6/2003 | Bharali et al. |
| 2003/0119568 A1 | 6/2003 | Menard |
| 2003/0195932 A1 | 10/2003 | Tanabe et al. ................ 709/205 |
| 2004/0103199 A1 | 5/2004 | Chao et al. ................... 709/228 |
| 2004/0177266 A1 | 9/2004 | Moyer et al. |
| 2004/0236874 A1 | 11/2004 | Largman et al. |
| 2004/0243823 A1 | 12/2004 | Moyer et al. |
| 2005/0033990 A1 | 2/2005 | Harvey et al. ................ 713/201 |
| 2005/0201373 A1 | 9/2005 | Shimazu et al. .............. 370/389 |
| 2005/0259587 A1 | 11/2005 | Wakumoto et al. ........... 370/248 |
| 2005/0286516 A1* | 12/2005 | Sundaresan et al. .......... 370/389 |
| 2006/0114566 A1 | 6/2006 | Ohmori et al. ................ 359/566 |
| 2006/0153092 A1 | 7/2006 | Matityahu et al. |
| 2006/0153110 A1 | 7/2006 | Morgan et al. ................ 370/310 |
| 2006/0173850 A1 | 8/2006 | Auer et al. ...................... 707/10 |
| 2006/0179311 A1 | 8/2006 | McCorkle et al. |
| 2006/0209719 A1 | 9/2006 | Previdi et al. |
| 2007/0223158 A1 | 9/2007 | Ma et al. ......................... 361/56 |
| 2009/0024612 A1 | 1/2009 | Tang et al. ........................ 707/5 |

OTHER PUBLICATIONS

Westmacott J., "Unidirectional Networking: GIAC Security Essential Certification Practical Assignment Version 1.46", SANS Institute, 2003.

Nilsen, Curt A., Information Security implementations for Remote Monitoring; Symposium on Int'l Safeguards, Int'l Atomic Energy Agency, Vienna, Austria, Oct. 13-17, 1997.

Nilsen, Curt A. et al., The Secure Data Mirror; INMM; Nuclear Materials Management; vol. XXVII (No. 2), 39th Annual Mtg. Proceedings, Naples, FL, Jul. 26-30, 1998, pp. 1322-1327.

* cited by examiner

BILATERAL COMMUNICATION USING MULTIPLE ONE-WAY DATA LINKS

FIELD OF INVENTION

The present invention relates generally to unidirectional data transfer. More particularly, the present invention relates to bilateral communication using multiple one-way data links.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), the content of which is hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms (or nodes) 101 and 102 (respectively, "the Send Node" and "the Receive Node") are connected to the unsecured external network 104 ("the source network") and the secure network 105 ("the destination network"), respectively. The Send Node 101 is connected to the Receive Node 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the Send Node and to an optical receiver on the Receive Node.

This configuration physically enforces one-way data transfer at both ends of the optical fiber connecting the Send Node 101 to the Receive Node 102, thereby creating a truly unidirectional one-way data link between the source network 104 and the destination network 105 shown in FIG. 1. Unlike the conventional firewalls, one-way data transfer systems based on a one-way data link are designed to transfer data or information only in one direction and it is physically impossible to transfer data or information of any kind in the reverse direction. No information or data of any kind, including handshaking protocols such as those used in data transport protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

When two different network security domains need to communicate bilaterally, it is often desirable and necessary to apply different security policies or protocols to data flows in different directions. Preferably, data transfers from a low security domain to a high security domain are subject to fewer security restrictions, while a high security domain has a need to protect its data from the low security domain by carefully configured security protocols. Hence, it is an object of the present invention to implement bilateral communication capable of applying different security policies depending on the direction of the data flow.

It is another object of the present invention to use multiple one-way data links to implement bilateral communication.

It is yet another object of the present invention to separately administer data transfer over each one-way data link in bilateral communication.

It is yet another object of the present invention to apply separate security policy to each one-way data link in bilateral communication.

It is yet another object of the present invention to provide separate data transfer configuration files for each one-way data link in bilateral communication.

It is yet another object of the present invention to provide the capability to apply different security policies, protocols or restrictions to the data transfers in opposite directions in bilateral communication using multiple one-way data links.

It is yet another object of the present invention to provide the capability to enforce different security levels for the data transfers in opposite directions in bilateral communication using multiple one-way data links.

It is yet another object of the present invention to provide the capability to allow different types of data for the data transfers in opposite directions in bilateral communication using multiple one-way data links.

It is yet another object of the present invention to provide the capability to apply different data filtering processes to the data transfers in opposite directions in bilateral communication using multiple one-way data links.

Other objects and advantages of the present invention will become apparent from the following description.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

SUMMARY OF THE INVENTION

It has now been found that the above and related objects of the present invention are obtained in the form of several related aspects, including bilateral communication using multiple one-way data links.

More particularly, the present invention relates to a bilateral data transfer system comprising a first node, a second node, a first one-way link for unidirectional transfer of first data from the first node to the second node, a second one-way link for unidirectional transfer of second data from the second node to the first node, a first data transfer application for administering the unidirectional transfer of the first data from the first node to the second node via the first one-way link, and a second data transfer application for administering the unidirectional transfer of the second data from the second node to the first node via the second one-way link.

The present invention is also directed to a data transfer application for bilateral communications between a first node and a second node, wherein the first node and the second node are interconnected by a first one-way link for unidirectional transfer of first data from the first node to the second node and a second one-way link for unidirectional transfer of second data from the second node to the first node, the data transfer application comprising a first data transfer application for administering the unidirectional transfer of the first data from the first node to the second node via the first one-way link, and a second data transfer application for administering the unidirectional transfer of the second data from the second node to the first node via the second one-way link.

Furthermore, the present invention also relates to a machine readable medium having instructions stored on at least one of a first node and a second node, wherein the first node and the second node are interconnected by a first one-way link for unidirectional transfer of first data from the first node to the second node and a second one-way link for unidirectional transfer of second data from the second node to the first node, the instructions, when executed by the at least one of the first and the second nodes, causing the first and the second nodes to separately administer the unidirectional transfer of the first data from the first node to the second node via the first one-way link and the unidirectional transfer of the second data from the second node to the first node via the second one-way link.

DETAILED DESCRIPTION OF PREFERRED EMBODIMENTS

Figure 1:
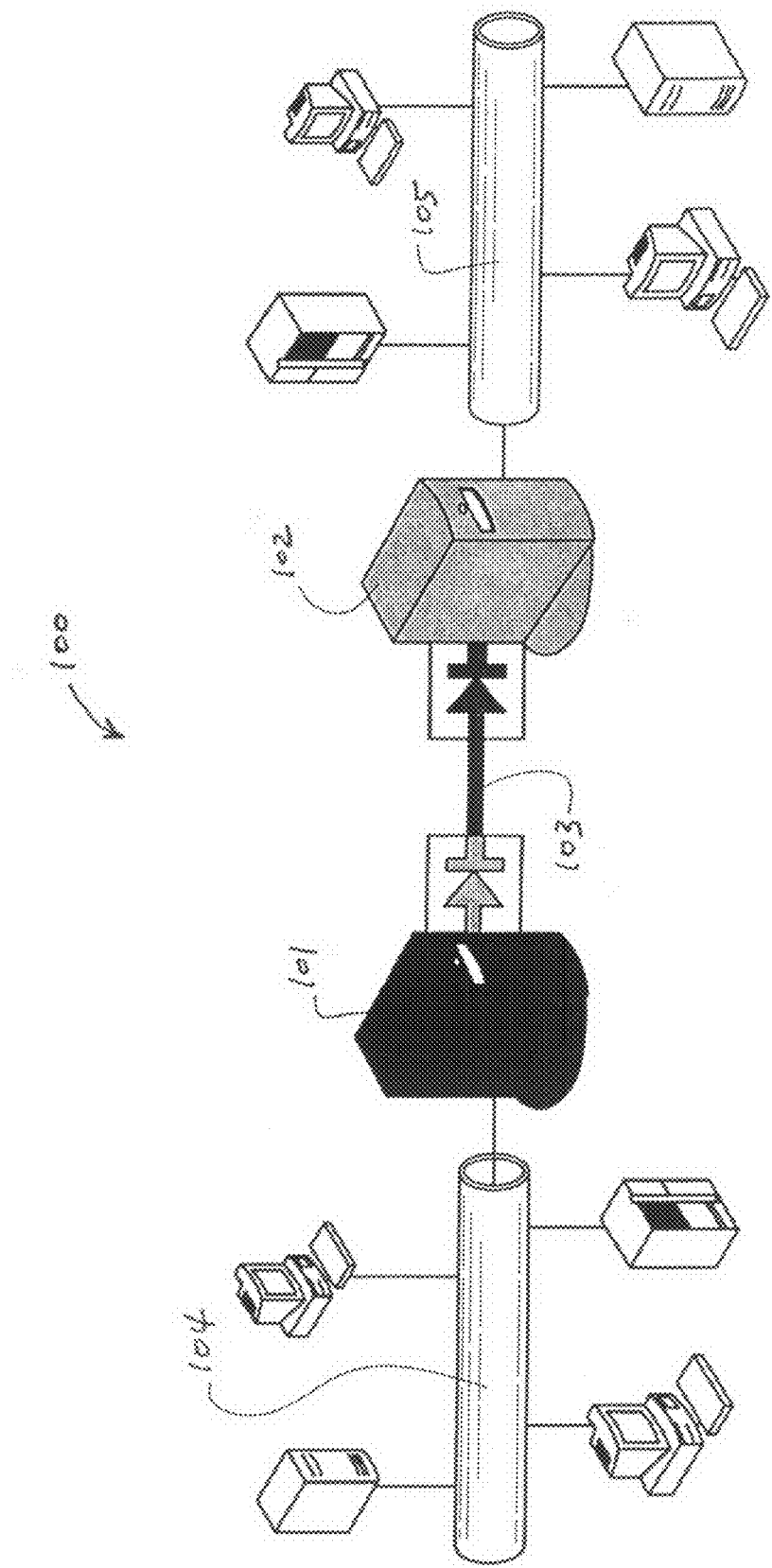
FIG. 1 schematically illustrates an example of a secure one-way data transfer system based on a one-way data link.
Figure 2:
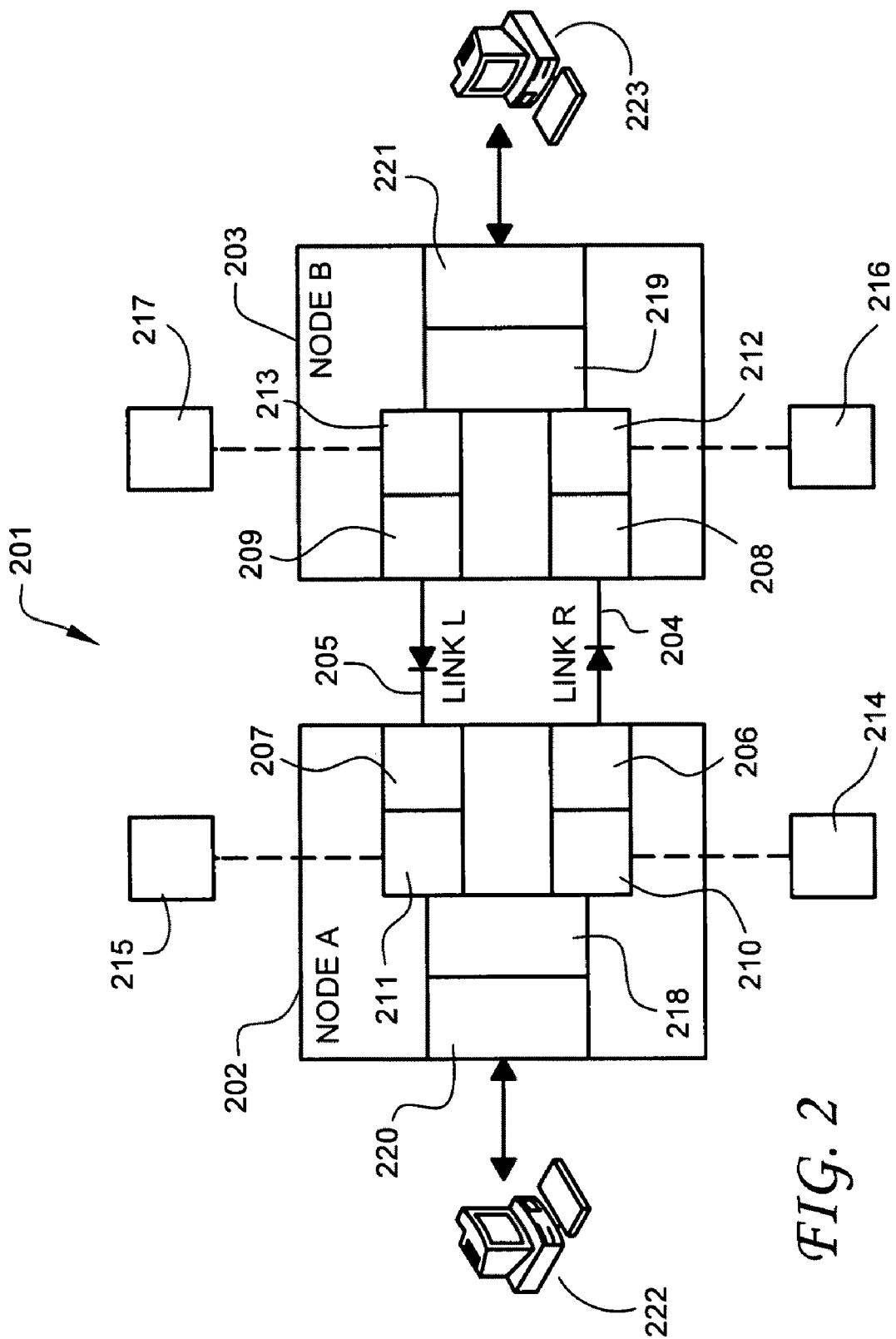
FIG. 2 is a functional block diagram that schematically illustrates one possible embodiment of the present invention.

Illustrated in FIG. 2 is a functional block diagram of an exemplary embodiment of the present invention for bilateral communication using multiple one-way data links. The system 201 comprises two computing platforms or nodes, Node A 202 and Node B 203, interconnected by two separate, oppositely directed one-way communication channels, Link R 204 and Link L 205. These one-way communication channels are deployed in parallel to enable bilateral communications between Node A and Node B, wherein Link R 204 is for unidirectional data transfer from Node A to Node B, while Link L 205 is for unidirectional data transfer in the opposite direction, from Node B to Node A. This arrangement forces all data traffic between Nodes A and B to flow unidirectionally through two entirely separate conduits. As further explained below, each of the unidirectional data transfers across these conduits, Link R 204 and Link L 205, is separately administered.

Although FIG. 2 shows a single one-way data link in each of the one-way communication channels, Link R 204 and Link L 205, the present invention is not restricted in any way with respect to the number of one-way data links used for bilateral communication, as long as the oppositely directed one-way data links are separately administered and are not cross-linked. For instance, each of Link R 204 and Link L 205 illustrated in FIG. 2 may comprise one or more one-way data links for the same data transfer direction.

The unidirectional data transfer across Link R 204 and the unidirectional data transfer across Link L 205 in the opposite direction are separately administered by the exemplary embodiment of the present invention illustrated in FIG. 2 in the following exemplary manner. Under the present invention, each of the one-way communication channels for bilateral communication may be associated with its own data transfer applications, interfaces and configuration files solely for the unidirectional data transfer in one direction, which are configured to prevent any cross-talk with the one-way communication channel for the opposite direction.

In FIG. 2, Link R 204, the one-way communication channel for unidirectional data transfer from Node A 202 to Node B 203, is associated with data sending application 210 and interface 206 in Node A 202 and data receiving application 212 and interface 208 in Node B 203. Meanwhile, Link L 205, the one-way communication channel for unidirectional data transfer from Node B 203 to Node A 202, is associated with data sending application 213 and interface 209 in Node B 203 and data receiving application 211 and interface 207 in Node A 202.

One-way data links used in Link R 204 and Link L 205 in FIG. 2 can be of any types of data transfer conduit that are capable of enforcing unidirectional data flow. For example, Link R 204 (or Link L 205) may comprise a high-bandwidth optical fiber whose both ends are respectively coupled to the data sending interface 206 in Node A (or 209 in Node B) and the data receiving interface 208 in Node B (or 207 in Node A). The data sending and receiving interfaces 206 and 208 (or 209 and 207) for the optical data link may comprise Asynchronous Transfer Mode (ATM) network interface cards which are specially configured to enforce unidirectional data flow from Node A to Node B (or from Node B to Node A). This and other examples of one-way data links and the corresponding network interface circuitry for enforcing unidirectional data flow through the links are disclosed in the co-pending U.S. patent application Ser. No. 11/787,778 by one of the inventors of the present application, the content of which is incorporated herein by reference in its entirety.

In FIG. 2, the data sending application 210 in Node A (or 213 in Node B) and data receiving application 212 in Node B (or 211 in Node A) in combination with proxy and session managing applications 220, 218 and 221, 219 respectively in Node A and Node B use Transmission Control Protocol/Internet Protocol (TCP/IP) as a user interface to the one-way data link in Link R 204 (or Link L 205). Examples of TCP-based one-way data transfer system are disclosed in the co-pending U.S. patent application Ser. No. 11/788,157 by the co-inventors of the present application, the content of which is incorporated herein by reference in its entirety.

The TCP proxy applications 220 and 221 are preferably TCP/IP socket-based proxy software, but may also be hardware-based or based on a suitable combination of software and hardware. The TCP proxy application 220 residing in Node A 202 fully implements TCP/IP-based bilateral communications between Node A and an external platform communicatively coupled to Node A, such as a remote terminal client 222 shown in FIG. 2. Likewise, the TCP proxy application 221 residing in Node B 203 fully implements TCP/IP-based bilateral communications between Node B and an external platform communicatively coupled to Node B, such as a remote terminal server 223 shown in FIG. 2.

The TCP session managing applications 218 and 219 are software-based applications for maintaining one or more TCP sessions. Each of the session managing applications 218 and 219 may additionally function as a communication channel manager for controlling the data traffic flows through the corresponding node. The session managing application 218, 219 in each node 202, 203 "splits" the bilateral communication channel between the node and corresponding remote terminal 222, 223 into two unidirectional communication channels based respectively on Link R 204 and Link L 205 in the following way. The session managing application 218 in Node A 202 routes any data coming from the remote terminal client 222 only to the data sending application 210, but not to the data receiving application 211; and it routes any data coming from Link L 205 through the data receiving application 211 to the remote terminal client 222 via the proxy application 220, but not to the data sending application 210. Likewise, the session managing application 219 in Node B 203 routes any data coming from the remote terminal server 223 only to the data sending application 213, but not to the data receiving application 212; and it routes any data coming from Link R 204 through the data receiving application 212 to the remote terminal server 223 via the proxy application 221, but not to the data sending application 213. In an alternative embodiment of the present invention, this channel managing function may be performed by the proxy applications 220, 221, instead of the session managing applications 218, 219.

While FIG. 2 shows one pair of proxy application 220 and session managing application 218 in each node 202, in an alternative embodiment of the present invention, each node may comprise two or more pairs of proxy and session managing applications. For example, if a node is coupled to two or more remote terminals, the corresponding number of pairs of proxy and session managing applications may be present in the node, wherein each pair is configured for routing data between the corresponding remote terminal and the data sending and receiving applications of the node.

The data sending application 210 in Node A and the data receiving application 212 in Node B associated with the one-way data link in Link R 204 operate in conjunction with the proxy and session managing applications 220, 221 and 218, 219 to simulate the TCP/IP protocol between the remote terminal client 222 and the remote terminal server 223 across the one-way data link in Link R 204 in the following way: When the TCP proxy application 220 receives TCP-based data packets or files from the remote terminal client 222, it removes the IP information normally carried in the data under the TCP/IP protocol and replaces it with pre-assigned channel numbers, so that no IP information is sent across the one-way data link in Link R 204. Instead, IP routes may be defined at the time of the configuration of the system 201 in the form of complementary channel mapping tables associated respectively with the data sending application 210 in Node A and data receiving application 212 in Node B. For the security of the overall system, neither table may be used to re-construct the other table, and neither table alone reveals the overall IP routing configuration from the remote terminal client 222 to the remote terminal server 223.

The session managing application 218 in Node A 202 maintains one or more TCP sessions and also routes the received data packets or files from the remote terminal client 222 via the proxy application 220 to the data sending application 210. The data sending application 210 is configured to send the data with the pre-assigned channel numbers to Node B 203 through the data sending interface 206 across the one-way data link in Link R 204. The data is then received by the data receiving application 212 in Node B 203 through the data receiving interface 208. The data receiving application 212 then maps the channel numbers from the received data to the TCP session managing application 219. The session managing application 219 maintains one or more TCP sessions and routes the received data packets or files from the data receiving application 212 to the proxy application 221. The TCP proxy application 221 in Node B fully implements the TCP/IP protocol in its bilateral communications with the remote terminal server 223, requests a socket connection and delivers the data received from the remote terminal client 222 to the remote terminal server 223.

In some embodiments of the present invention, the pair of the proxy and session managing applications 221, 219 in Node B 203 may be configured to control the socket connections between the Node B and the remote terminal server 223. In this way, the remote terminal server 223 can be prevented from initiating a connection with the proxy application 221 in Node B to, for example, request information from the remote terminal client 222. This configuration further enhances the security of the remote terminal client 222, while providing it with the ability to request and obtain information from the remote terminal server 223 through bilateral communications using one-way communication channels Link R and Link L.

As shown in FIG. 2, the definition of the IP routes (e.g., in the form of channel mapping tables) may be stored in data sending configuration file 214 associated with the data sending application 210 in Node A and data receiving configuration file 216 associated with the data receiving application 212 in Node B. The data sending configuration file 214 (e.g., Hostports.txt.) may include IP filtering information that defines allowable source network addresses. The data sending configuration file 214 may be located within the data sending application 210, or may be located elsewhere within the same software zone as the data sending application 210 to be accessible by it. The data receiving configuration file 216 (e.g., Portmap.txt.) defines destination network addresses. The data receiving configuration file 216 may be located in the data receiving application 212, or may be located elsewhere within the same software zone as the data receiving application 212 to be accessible by it. While not shown in FIG. 2, each of the session managing applications 218, 219 (or, alternatively, the proxy applications 220, 221) may have a data routing configuration file for managing and controlling the data traffics between its corresponding remote terminal 222, 223 coupled to the node and data sending/receiving applications 210/211, 213/212 in the node.

The data transfer in the opposite direction, from the remote terminal server 223 to the remote terminal client 222 via the one-way data link in Link L 205, is conducted in a similar manner. However, it is important to emphasize that the one-way data transfer across Link L 205 is associated with the data sending and receiving applications, interfaces and configuration files that are entirely separate from those associated with the one-way data transfer across Link R 204 in the opposite direction.

The data sending application 213 in Node B and the data receiving application 211 in Node A associated with the one-way data link in Link L 205 operate in conjunction with the proxy and session managing applications 221, 220 and 219, 218 to simulate the TCP/IP protocol between the remote terminal server 223 and the remote terminal client 222 across the one-way data link in Link L 205. When the TCP proxy application 221 receives TCP-based data packets or files from the remote terminal server 223, it replaces the IP information associated with the data with pre-assigned channel numbers, so that no IP information is sent across the one-way data link in Link L 205. Instead, IP routes may be defined at the time of the configuration of the system 201 in the form of complementary channel mapping tables associated respectively with the data sending application 213 in Node B and data receiving application 211 in Node A. The definition of the IP routes (e.g., in the form of channel mapping tables) may be stored in data sending configuration file 217 associated with the data sending application 213 in Node B and data receiving configuration file 215 associated with the data receiving application 211 in Node A. Like the configuration files associated with the data transfer across Link R 204, the data sending configuration file 217 (e.g., Hostports.txt.) may include IP filtering information that defines allowable source network addresses, and the data receiving configuration file 215 (e.g., Portmap.txt.) defines destination network addresses. The data sending configuration file 217 may be located within the data sending application 213 in Node B, or, alternatively, may be located elsewhere within the same software zone as the data sending application 213 to be accessible by it. Likewise, the data receiving configuration file 215 may be located within the data receiving application 211 in Node A, or, may alternatively be located elsewhere within the same software zone as the data receiving application 211 to be accessible by it.

The session managing application 219 in Node B 203 maintains one or more TCP sessions and routes the received data packets or files from the remote terminal server 223 via the proxy application 221 to the data sending application 213. The data sending application 213 is configured to send the received data with the pre-assigned channel numbers to Node A 202 through the data sending interface 209 across the one-way data link in Link L 205. The data is then received by the data receiving application 211 in Node A 202 through the data receiving interface 207. The data receiving application 211 then maps the channel numbers from the received data to the TCP session managing application 218. The session managing application 218 maintains one or more TCP sessions and routes the received data packets or files from the data receiving application 211 to the proxy application 220. The TCP proxy application 220 in Node A fully implements the TCP/IP protocol in its bilateral communications with the remote terminal client 222, requests a socket connection and delivers the data received from the remote terminal server 223 to the remote terminal client 222.

Under the present invention, each node may be partitioned into three separately administered software zones or virtual machines, with one zone associated with a data sending application, another zone associated with a data receiving application and a third zone associated proxy and session managing applications for controlling the data traffics between a remote terminal coupled to the node and the data sending and receiving applications in the node. In FIG. 2, Node A 202 may comprise three separately administered software zones, wherein a first zone comprises the data sending application 210, its associated data sending configuration file 214 and data sending interface 206, a second zone comprises the data receiving application 211, its associated data receiving configuration file 215 and data receiving interface 207, and a third zone comprises the proxy and session managing applications 220, 218 with their associated data routing configuration file (not shown in FIG. 2). Node B 203 may likewise comprise three separately administered software zones, wherein a first zone comprises the data sending application 213, its associated data sending configuration file 217 and data sending interface 209, a second zone comprises the data receiving application 212, its associated data receiving configuration file 216 and data receiving interface 208, and a third zone comprises the proxy and session managing applications 221, 219 with their associated data routing configuration file (not shown in FIG. 2). This zoning or partitioning of each node further ensures separate administration of the one-way communication channels 204, 205 between the nodes 202, 203, thereby preventing cross-talks between the one-way communication channels 204, 205 and enabling secure bilateral communication between the remote terminals 222, 223 via the nodes 202, 203.

While FIG. 2 illustrates an exemplary embodiment using TCP-based data transfers, the present invention is not limited with respect to data types or types of data transport protocol used in data transfers. The data sending and receiving applications and proxy and session managing applications supporting other data transport protocol, such as User Datagram Protocol (UDP), or even multiple data transport protocols may be implemented in accordance with the present invention. Examples of data sending and receiving applications and proxy application supporting TCP data packet and file transfers, UDP datagram transfer and concurrent data transfers involving two or more different data transport protocols are disclosed in the co-pending U.S. patent application Ser. No. 11/788,157 by the co-inventors of the present application, the content of which has been incorporated herein by reference in its entirety.

The foregoing descriptions of the exemplary embodiment of the present invention in FIG. 2 show that by deploying in parallel two one-way data transfer systems based on one-way data links, bilateral communications between two terminals can be separated or segregated into two one-way communication channels, each of which can be subject to separate data routing configuration and administration. By separately configuring and administering each of the data routing associated with the one-way data transfer across Link R 204 (e.g., through the data sending and receiving configuration files 214 and 216) and the data routing associated with the one-way data transfer across Link L 205 in the opposite direction (e.g., through the data sending and receiving configuration files 217 and 215), it is possible to impose different data filtering process, different type or level of security policy or restriction, different restriction on allowable data types, etc. on each of the one-way communication channels 204 and 205. In this way, significant benefits in network security can be achieved.

Such an arrangement can enable more secure bilateral communications across two different security domains, since it provides an agent or terminal in a high security domain with the capability to impose and administer unique security constraints on each direction of the data exchange with a low security domain. The embodiment described above and in FIG. 2 is capable of supporting the inherently different security checks and restrictions required for transferring data to a high security domain and for transferring data from it. For example, the session managing applications 218 and 219, and their associated data sending and receiving configuration files (not shown) associated with the data transfer across Link R 204 may be configured so that only keyboard and mouse data and no other data are allowed to pass from the remote terminal client 222 in a high-security domain to a remote terminal server 223 in a low-security domain through the one-way data link in Link R 204. At the same time, the session managing applications 219 and 218, and their associated data sending and receiving configuration files (not shown) associated with the data transfer across Link L 205 may be configured so that only graphical display data and no other data are allowed to pass from the remote terminal server 223 to the remote terminal client 222 through the one-way data link in Link L 205. Such a session-based TCP/IP communication system allows the remote terminal client 222 in the high-security domain to be hosted by the remote terminal server 223 in the low-security domain. All the communications between them are separated into one-way data transfer channels, Link R and Link L, each of which may be subject to separately administered security restrictions, or data filtering processes, etc. In this way, secure remote terminal services and Web browsing across different network security domains may be enabled through bilateral communication using multiple one-way data links.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A bilateral data transfer system comprising:
    a first node;
    a second node;
    a first one-way link for unidirectional transfer of first data from the first node to the second node; and
    a second one-way link for unidirectional transfer of second data from the second node to the first node
    wherein the first node comprises:
    a processor;
    a memory storing a first data sending application, a second data receiving application and a first session managing application;
    and wherein the processor is configured to execute:
    the first data sending application for sending the first data to the second node over the first one-way link;
    the second data receiving application for receiving the second data from the second node over the second one-way link; and
    the first session managing application for blocking the first data from the second data receiving application and for blocking the second data from the first data sending application, and
    wherein the second node comprises:
    a processor;
    a memory storing a first data receiving application, a second data sending application and a second session managing application;
    wherein the processor is configured to execute:
    the first data receiving application for receiving the first data from the first node over the first one-way link;
    the second data sending application for sending the second data to the first node over the second one-way link; and
    the second session managing application for blocking the first data from the second data sending application and for blocking the second data from the first data receiving application, so that the unidirectional transfer of the first data across the first one-way link and the unidirectional transfer of the second data across the second one-way link are independently administered by the bilateral data transfer system
    wherein:
    the first data comprises keyboard or mouse commands from a remote terminal client;
    and the second data comprises graphical display data from a remote terminal server.

2. The data transfer system of claim 1, further comprising:
    a first data sending configuration file and a first data receiving configuration file for filtering and routing the first data, wherein the first data sending configuration file is accessible by the first data sending application and the first data receiving configuration file is accessible by the first data receiving application; and
    a second data sending configuration file and a second data receiving configuration file for filtering and routing the second data, wherein the second data sending configuration file is accessible by the second data sending application and the second data receiving configuration file is accessible by the second data receiving application.

3. The data transfer system of claim 1, further comprising a remote terminal client connected to the first node and a remote terminal server connected to the second node.

4. The data transfer system of claim 3, wherein:
    the first session managing application is configured to route the first data from the remote terminal client only to the first data sending application and configured to route the second data from the second data receiving application only to the remote terminal client; and
    the second session managing application is configured to route the first data from the first data receiving application only to the remote terminal server and configured to route the second data from the remote terminal server only to the second data send application.

5. The data transfer system of claim 4, wherein the first session managing application is configured to implement bilateral TCP communications with the remote terminal client, and the second session managing application is configured to implement bilateral TCP communications with the remote terminal server.

6. The data transfer system of claim 1, wherein the first data sending and receiving applications and the second data sending and receiving applications are configured to respectively apply different security constraints to the unidirectional transfer of the first data over the first one-way link and the unidirectional transfer of the second data over the second one-way link.

7. A non-transitory machine readable medium having instructions stored on at least one of a first node and a second node, wherein the first node and the second node are interconnected by a first one-way link for unidirectional transfer of first data from the first node to the second node and a second one-way link for unidirectional transfer of second data from the second node to the first node, the instructions, when executed by the at least one of the first and the second nodes, causing the first and the second nodes to separately administer the unidirectional transfer of the first data from the first node to the second node via the first one-way link and the unidirectional transfer of the second data from the second node to the first node via the second one-way link, wherein the first data comprises keyboard or mouse commands from a remote terminal client connected to the first node and the second data comprises graphical display data from a remote terminal server connected to the second node.

8. The non-transitory machine readable medium of claim 7, wherein the step to separately administer by the first and the second nodes comprises the steps to:
    filter and route the first data using a first data transfer configuration file; and
    filter and route the second data using a second data transfer configuration file.

9. The non-transitory machine readable medium of claim 8, wherein:

the first data transfer configuration file comprises a first data sending configuration file in the first node and a first data receiving configuration file in the second node; and the second data transfer configuration file comprises a second data sending configuration file in the second node and a second data receiving configuration file in the first node.

10. The non-transitory machine readable medium of claim 7, wherein the instructions, when executed by the at least one of the first and the second nodes, further cause:

the first node to further administer bilateral communications with a remote terminal client; and the second node to further administer bilateral communications with a remote terminal server.

11. The non-transitory machine readable medium of claim 10, wherein the bilateral communications between the first node and the remote terminal client are TCP-based.

12. The non-transitory machine readable medium of claim 10, wherein the bilateral communications between the second node and the remote terminal server are TCP-based.

13. The non-transitory machine readable medium of claim 7, wherein the step to separately administer by the first and the second nodes comprises the step to apply different security constraints to the unidirectional transfer of the first data from the first node to the second node via the first one-way link and the unidirectional transfer of the second data from the second node to the first node via the second one-way link.

14. The data transfer system of claim 1, further comprising a first data routing configuration file associated with the first session managing application and a second data routing configuration file associated with the second session managing application.

15. The data transfer system of claim 1, wherein:

the first node comprises a first software zone comprising the first data sending application, a second software zone comprising the second data receiving application, and a third software zone comprising the first session managing application; and the second node comprises a fourth software zone comprising the second data sending application, a fifth software zone comprising the first data receiving application, and a sixth software zone comprising the second session managing application, wherein each of the software zones is capable of separate administration.

16. The data transfer system of claim 5, wherein the second session managing application is configured to control a connection between the second node and the remote terminal server so that the remote terminal server cannot initiate the connection.

17. A non-transitory machine readable medium having instructions stored on at least one of a first node and a second node, wherein the first node and the second node are interconnected by a first one-way link for unidirectional transfer of first data from the first node to the second node and a second one-way link for unidirectional transfer of second data from the second node to the first node, the instructions, when executed by the first node, causing the first node to:

execute a first data sending application to send the first data to the second node over the first one-way link;

execute a second data receiving application to receive the second data from the second node over the second one-way link; and execute a first session managing application to block the first data from the second data receiving application and to block the second data from the first data sending application, further the instructions, when executed by the second node, causing the second node to:

execute a first data receiving application to receive the first data from the first node over the first one-way link;

execute a second data sending application to send the second data to the first node over the second one-way link; and execute a second session managing application to block the first data from the second data sending application and to block the second data from the first data receiving application, so that the unidirectional transfer of the first data across the first one-way link and the unidirectional transfer of the second data across the second one-way link are independently administered by the instructions wherein:

the first data comprises keyboard or mouse commands from a remote terminal client connected to the first node; and the second data comprises graphical display data from a remote terminal server connected to the second node.

18. The non-transitory machine readable medium of claim 17, wherein:

the step to execute the first data sending application comprises the step to read a first data sending configuration file to route the first data;

the step to execute the first data receiving application comprises the step to read a first data receiving configuration file to route the first data;

the step to execute the second data sending application comprises the step to read a second data sending configuration file to route the second data; and the step to execute the second data receiving application comprises the step to read a second data receiving configuration file to route the second data.

19. The non-transitory machine readable medium of claim 17, wherein:

the step to execute the first session managing application comprises the step to route the first data from a remote terminal client connected to the first node only to the first data sending application and the step to route the second data from the second data receiving application only to the remote terminal client; and the step to execute the second session managing application comprises the step to route the first data from the first data receiving application only to a remote terminal server connected to the second node and the step to route the second data from the remote terminal server only to the second data sending application.

20. The non-transitory machine readable medium of claim 17, wherein:

the step to execute the first session managing application comprises the step to implement bilateral TCP communications between the first node and a remote terminal client; and the step to execute the second session managing application comprises the step to implement bilateral TCP communications between the second node and a remote terminal server.

21. The non-transitory machine readable medium of claim 17, wherein:

the steps to execute the first data sending application and the first data receiving application comprise the step to apply a first security constraint to the unidirectional transfer of the first data over the first one-way link;

the steps to execute the second data sending application and the second data receiving application comprise the step to apply a second security constraint to the unidirectional transfer of the second data over the second one-way link; and the first security constraint and the second security constraint are different.

22. The non-transitory machine readable medium of claim 17, wherein:

the step to execute the first session managing application comprises the step to read a first data routing configuration file; and the step to execute the second session managing application comprises the step to read a second data routing configuration file.

23. The non-transitory machine readable medium of claim 17, wherein:

the first node comprises a first software zone comprising the first data sending application, a second software zone comprising the second data receiving application, and a third software zone comprising the first session managing application;

the second node comprises a fourth software zone comprising the second data sending application, a fifth software zone comprising the first data receiving application, and a sixth software zone comprising the second session managing application; and each of the software zones is capable of separate administration.

* * * * *